US008234376B2

(12) United States Patent
Jimmei (10) Patent No.: US 8,234,376 B2
(45) Date of Patent: Jul. 31, 2012

(54) SERVER APPARATUS AND METHOD OF PREVENTING DENIAL OF SERVICE ATTACKS, AND COMPUTER PROGRAM PRODUCT

(75) Inventor: Tatsuya Jimmei, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 514 days.

(21) Appl. No.: 11/808,149

(22) Filed: Jun. 7, 2007

(65) Prior Publication Data

US 2008/0104182 A1 May 1, 2008

(30) Foreign Application Priority Data

Oct. 26, 2006 (JP) ................................ 2006-291521

(51) Int. Cl.
*G06F 15/173* (2006.01)
(52) U.S. Cl. ............ 709/225; 709/224; 709/217; 726/3; 726/23
(58) Field of Classification Search ........................ None
See application file for complete search history.

(56) References Cited

U.S. PATENT DOCUMENTS

| 5,958,053 | A  | * | 9/1999  | Denker ............................ 726/1 |
| 6,185,680 | B1 | * | 2/2001  | Shimbo et al. ................. 713/160 |
| 6,324,648 | B1 | * | 11/2001 | Grantges, Jr. ................... 726/12 |
| 7,124,173 | B2 | * | 10/2006 | Moriarty ........................ 709/219 |
| 7,593,740 | B2 | * | 9/2009  | Crowley et al. ............. 455/456.3 |
| 7,693,946 | B2 | * | 4/2010  | Tonegawa ..................... 709/206 |
| 7,900,254 | B1 | * | 3/2011  | Fisher et al. .................... 726/22 |
| 7,970,878 | B1 | * | 6/2011  | Burshan et al. ............... 709/223 |
| 2001/0054157 | A1 | * | 12/2001 | Fukumoto ..................... 713/201 |
| 2002/0143883 | A1 | * | 10/2002 | Miyake et al. ................ 709/206 |
| 2003/0070096 | A1 | * | 4/2003  | Pazi et al. ..................... 713/201 |
| 2003/0097564 | A1 | * | 5/2003  | Tewari et al. ................. 713/171 |
| 2003/0226034 | A1 | * | 12/2003 | Howard et al. .............. 713/201 |
| 2004/0107234 | A1 | * | 6/2004  | Rajahalme ................... 709/200 |
| 2005/0240989 | A1 | * | 10/2005 | Kim et al. ...................... 726/11 |

(Continued)

FOREIGN PATENT DOCUMENTS

JP 2004-194196 7/2004

(Continued)

OTHER PUBLICATIONS

J. Damas et al., "Preventing Use of Recursive Nameservers in Reflector Attacks," IETF Internet Draft, http://www.ietf.org/internet-drafts/draft-ietf-dnsop-reflectors-are-evil-02.txt (Sep. 2006).

(Continued)

*Primary Examiner* — Ian N Moore
*Assistant Examiner* — Dung B Huynh
(74) *Attorney, Agent, or Firm* — Finnegan, Henderson, Farabow, Garrett & Dunner, L.L.P.

(57) ABSTRACT

A server apparatus receives a query message, calculates an identifying data based on an address and a query name containing in the query message, creates a response message containing the identifying data for requesting a redirect reply or a response message containing an answer to the query name, determines whether the query message is a redirect message and further determines whether the response message containing the answer is larger than a threshold value, and finally transmits either one of the response messages.

9 Claims, 6 Drawing Sheets

U.S. PATENT DOCUMENTS

| | | | |
|---|---|---|---|
| 2006/0212572 A1* | 9/2006 | Afek et al. | 709/225 |
| 2007/0192861 A1* | 8/2007 | Varghese et al. | 726/23 |
| 2008/0144609 A1 | 6/2008 | Kim et al. | |
| 2009/0172122 A1* | 7/2009 | Toume et al. | 709/206 |

FOREIGN PATENT DOCUMENTS

| | | |
|---|---|---|
| JP | 2006-79598 | 3/2006 |
| JP | 2008-530846 | 8/2008 |
| WO | WO 2006/083052 A1 | 8/2006 |

OTHER PUBLICATIONS

D. Eastlake III, "Domain Name System (DNS) Cookies," IETF Internet Draft http://www.ietf.org/internet-drafts/eastlake-dnsext-cookies-00.txt (Jun. 2006).

Notice of Rejection issued by the Japanese Patent Office on Sep. 2, 2008, for Japanese Patent Application No. 2006-291521, and partial English translation thereof.

* cited by examiner

| UDP HEADER | DNS HEADER | QUESTION | ANSWER (Name=www.foo.example,Type=5,CNAME=rcnamewww.XXXX.foo.example) |

SERVER APPARATUS AND METHOD OF PREVENTING DENIAL OF SERVICE ATTACKS, AND COMPUTER PROGRAM PRODUCT

CROSS-REFERENCE TO RELATED APPLICATIONS

This application is based upon and claims the benefit of priority from the prior Japanese Patent Application No. 2006-291521, filed on Oct. 26, 2006; the entire contents of which are incorporated herein by reference.

BACKGROUND OF THE INVENTION

1. Field of the Invention

The present invention relates to a server apparatus, a method, and a computer program product that can prevent denial-of-service attacks caused by transmitting a response packet that is amplified by a packet in which a query source is personated.

2. Description of the Related Art

Domain name system (DNS), one of backbone functions for the Internet, is a client-server database system for providing services based on data associated host names with internet protocol (IP) addresses. A DNS client transmits a query packet containing a specific domain name (such as a host name) to a server, and the server processes the query packet and transmit back to the client a response packet containing data corresponding to the query (a resource record or simply called a record).

The server generally returns the response packet without authenticating the client. It means that the server equally responds to any client. Especially, an authoritative server, as a general rule, has to respond to all of the queries transmitted from clients.

Denial-of-service (DoS) attacks that exploit the authoritative server have become in the focus, recently. In the DoS attacks, an attacker node transmits a query packet with a spoofed source address pretending as a victim node to a server. The attacker uses a domain name or a resource record that causes the server to create a response packet with a data size much larger than that of the query packet. A data size of a usual DNS response packet is larger than that of the query packet corresponding to itself. A data size of a response message using extension mechanisms for DNS (EDNSO) or DNS security extensions (DNSSEC) may become ten times as large as that of the query packet corresponding to itself.

The server transmits the response packet to the source address of the query packet. Because the source address is spoofed, the response packet is transmitted to the victim node. As a data size of a response packet is larger than that of the query packet corresponding to itself, the attacker node can cause a severe damage with a relatively small band. For example, if the data size of the response packet becomes ten times as large as that of the query packet corresponding to itself and a network band of 10 Mbps (megabits per second) is used, a caused damage is equivalent to that in case of using 100 Mbps.

To prevent the DoS attacks, various techniques have been proposed. For example, in a technique described in an article entitled, "Preventing Use of Recursive Nameservers in Reflector Attacks", by J. Damas et. al, retrieved from the Internet: <URL: http://www.ietf.org/internet-drafts/draft-ietf-dnsop-reflectors-are-evil-02.text>, an address-based query filter is used to prevent the query with a spoofed source address. According to the technique disclosed in "Preventing Use of Recursive Nameservers in Reflector Attacks", the address-based query filter enables the server to limit queries received from qualified clients with predetermined addresses (generally, from nodes of an organization to which the server belong). It means that the nodes on the network having a possibility to be attacked are restricted. However, the authoritative server, which has to respond every queries regardless of which client is transmitted the query, can not employ the technique.

Another article entitled, "Domain Name System (DNS) Cookies", by Donald E. Eastlake 3-rd, retrieved from the Internet: <URL: http://www.ietf.org/internet-drafts/eastlake-dnsext-cookies-00.txt>, discloses a technique for extending DNS protocols and transferring cookies between the server and the clients, which make it possible to prevent from unconditionally responding to the query with a spoofed source address.

However, although the technique disclosed in "Domain Name System (DNS) Cookies" can be employed by the authoritative server, it is necessary for the clients to support the system used in the technique. It means that the system does not effectively work until all of the existing clients on the Internet support the system used in the technique.

SUMMARY OF THE INVENTION

According to one aspect of the present invention, a server apparatus capable of communicating with at least one of client apparatuses via a network, the server apparatus includes a first receiving unit configured to receive a first query message that contains address data for indicating a source client apparatus and query data concerning a question via the network; a first calculating unit configured to calculate a first identifying data based on the address data contained in the first query message; a first creating unit configured to relate the first identifying data with the query data, and creates a first response message that contains the query data related with the first identifying data and reply requesting data for requesting to re-transmit the question; a first transmitting unit configured to transmit the first response message to the client apparatus specified by the address data; a second receiving unit configured to receive a second query message that contains the address data and the query data related with the first identifying data via the network; a second calculating unit configured to calculate a second identifying data based on the address data contained in the second query message; a determining unit configured to determine validity of the client apparatus that has specified by the address data based on the first identifying data related with the query data contained in the second query message and the second identifying data; a second creating unit configured to create a second response message that contains an answer to the query data when the determining unit determines that the client apparatus specified by the address data is valid; and a second transmitting unit configured to transmit the second response message to the client apparatus specified by the address data.

According to another aspect of the present invention, a method of preventing denial-of-service attack to a server apparatus capable of communicating with at least one of client apparatuses via a network, the method includes receiving via the network a first query message that contains address data for indicating a source client apparatus and query data concerning a question; calculating a first identifying data based on the address data contained in the first query message; relating the first identifying data with the query data; creating a first response message that contains the query data related with the first identifying data and reply requesting data for requesting to transmit the question again; transmitting the first response message to the client apparatus specified by the address data; receiving via the network a second query message that contains the address data and the query data related with the first identifying data; calculating a second identifying data based on the address data contained in the second query message; determining validity of the client apparatus that has specified by the address data based on the first identifying data related with the query data contained in the second query message and the second identifying data; creating a second response message that contains an answer to the query data when the client apparatus specified by the address data is determined to be valid; and transmitting the second response message to the client apparatus specified by the address data.

A computer program product according to still another aspect of the present invention causes a computer to perform the method according to the present invention.

DETAILED DESCRIPTION OF THE INVENTION

Exemplary embodiments of the present invention are described in detail below with reference to the accompanying drawings.

In a server apparatus according to an embodiment, upon receiving a query from a client, the server apparatus returns a response message for redirecting, without responding immediately to a first query from the client. Then, upon receiving a redirect reply message to the response message from the client, the server apparatus returns a response message containing the answer to the query. In this time, the server apparatus contains data depending on a source address into the response message for requesting to a redirect reply, and determines whether the redirect reply message is valid when receiving of the redirect reply message by using the data.

In the present embodiment, a DNS server 100 is used as the server apparatus for returning responses to queries from clients. Not limited to the DNS server, the present embodiment can apply to any device that has a capability of returning responses to queries, or a possibility to become a target of DoS attacks.

Figure 1:
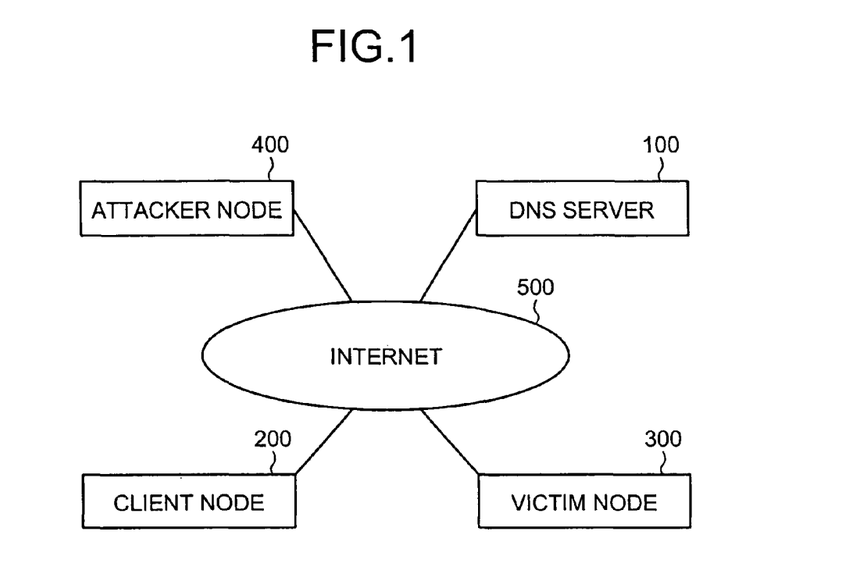
FIG. 1 is a schematic view of a network configuration including a DNS server.

As shown in FIG. 1, the DNS server 100 is connected to a client node 200 that transmits a query, a victim node 300, and an attacker node 400 via an Internet 500. Both the victim node 300 and the attacker node 400 are ones of the client nodes 200. The victim node 300 is a victim of a DoS attack, while the attacker node 400 is an attacker of the DoS attack. When it is not required to specify the attacker side and the victim side, a node that transmits a query is called the client node 200.

The DNS server 100 is assumed to administer a DNS zone (a subclass of a domain space administered by a specific server group) named "foo.example". The DNS server 100 includes a storage unit (not shown) in which a predetermined threshold value is stored for a determination for preventing DoS amplification attacks. The threshold value can be used for extracting, for example, a query packet causing a response packet with a data size five times as large as the query packet or larger, or extracting a query packet causing a response packet larger than the query packet.

With the threshold value, the DNS server 100 can avoid executing an anti-DoS process against an ineffective DoS attack by executing the anti-DoS process only when it is determined that the data size is larger than the threshold value.

It is assumed that there are two domain names of "www" and "zzz" in the "foo.example" zone. A data size of a response message to a query on "www.foo.example" is larger than the threshold value, while a data size of a response message to a query on "zzz.foo.example" is smaller than the threshold value. Specifically, a response message to a typical query message on "www.foo.example" has a data size large enough for having the anti-DoS process executed, while a response message to a typical query message on "zzz.foo.example" has a size small enough for not having anti-DoS attack process executed.

Figure 2:
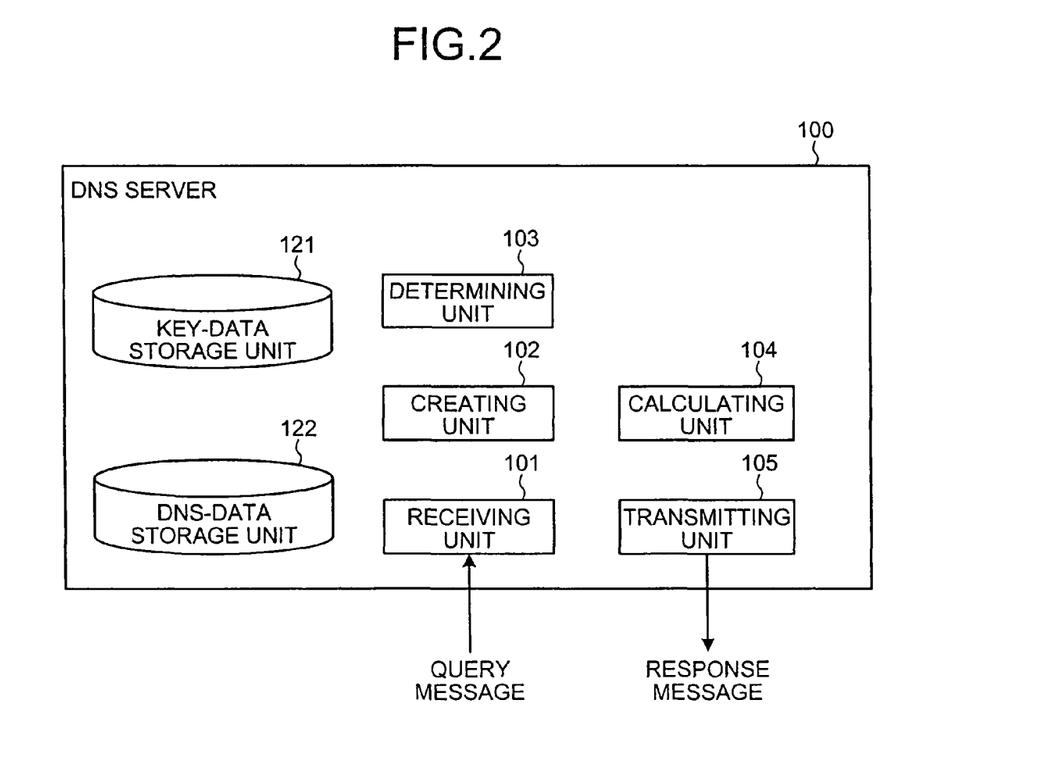
FIG. 2 is a block diagram of a DNS server according to an embodiment of the present invention.

As shown in FIG. 2, the DNS server 100 includes a key-data storage unit 121, a DNS-data storage unit 122, a receiving unit 101, a creating unit 102, a determining unit 103, a calculating unit 104, and a transmitting unit 105.

The key-data storage unit 121 stores therein a secret key K known only by an administrator of the DNS server 100. The secret key K is used for creating a canonical name (CNAME) record-based response message for requesting a redirect reply. The secret key K can be expressed by, for example, a 128-bit integral value.

The DNS-data storage unit 122 stores therein data on the DNS zone provided by the DNS server 100. The DNS-data storage unit 122 can store therein data obtained from another DNS server as a cache.

Any widely-used storage medium such as a hard disk drive (HDD), an optical disk, a memory card, or a random access memory (RAM) can be employed as the key-data storage unit 121 and the DNS-data storage unit 122.

The receiving unit 101 receives various messages from the client node 200. Specifically, the receiving unit 101 receives DNS query messages for requesting a name resolution of a target domain name from the client node 200. The query messages conform to the conventional DNS packet and contain an IP address of the client node 200 (the source IP address).

The creating unit 102 creates a response message to the received query message. Specifically, when the received query message is an ordinal DNS query message, that is, not a reply to a response message for requesting a redirect reply, the creating unit 102 creates a response message containing reply requesting data that requests a redirect reply with the query name to be expressed in another form. According to the present embodiment, the response message for requesting a redirect reply contains the CNAME record as the reply requesting data.

The CNAME record is one type of DNS records that can be contained in a response message transmitted from the DNS server 100, and is expressed in a form of "[target domain name (A)][CNAME][formal domain name (canonical name) of A]". According to DNS specifications, the client node 200 that receives the response message containing the CNAME record should re-transmit the query with a canonical name.

The creating unit 102 creates the response message for redirect reply containing an edited domain name containing a hash value calculated from the source IP address, the target domain name, and the secret key K as the canonical name. The hash value is calculated by the calculating unit 104.

For example, when the target domain name is "www.foo.example", the creating unit 102 creates "www.foo.example. CNAME rcnamewww.XXXX.foo.example" as a CNAME record-based response message, where "rcname" is a character string representing itself as a redirect CNAME record-based name, "www" following "rcname" is a label of the target domain name in the foo.example domain, and "XXXX" is a character string corresponding to the hash value. Other than "rcname", any character string can be available when a combination with the following label (in the above example, "rcnamewww") is not used for the other domain names registered in the zone. The number of domain names in a specific fixed zone is finite, so that an available character string can always be found.

Upon receiving the query message for requesting the name resolution of the target domain name expressed in the canonical name (hereinafter, a "redirect message"), the creating unit 102 creates a response message containing a resource record, that is, a result of the name resolution. Specifically, depending on the a result of a determination by the determining unit 103, the creating unit 102 obtains the resource record corresponding to the original domain name extracted from the edited domain name expressed in the canonical name from the DNS-data storage unit 122, and creates the response message containing the obtained resource record as the result of the name resolution.

The creating unit 102 may also create a response message containing the calculated hash value in a predetermined separate field of the message itself, instead of embedding the calculated hash value in the canonical name for redirect. In this case, the client node 200 obtains the hash value from the predetermined field of the response message, stores the obtained hash value in a predetermined separate field of the redirected query message, and transmits the redirected query message to the DNS server 100. The DNS server 100 obtains the hash value in the predetermined filed of the query message to compare the obtained hash value with a re-calculated hash value.

The determining unit 103 determines whether the received query message is a redirect message, and, when it is determined that the query message is the redirect message, determines whether the redirect message is valid using the secret key K stored in the key-data storage unit 121. The detailed process for determining validity of the client node 200 is described later.

Additionally, the determining unit 103 determines whether the data size of the response message is larger than the threshold value. Based on a result of the determination, the response message for requesting the redirect reply is created only when the data size of the response message is larger than the threshold value.

The calculating unit 104 calculates the hash value by a one-way hash function from the source IP address, the domain name (both contained in the query message), and the secret key K. Because the hash value is calculated from the source IP address, that is, the IP address of the client node 200 as a hash key, the calculated hash value can be used as an identifying data to determine whether a message is transmitted from the client node 200 which has validity. Moreover, because the hash value is calculated from the secret key K, which is known only by the administrator of the DNS server 100, it is impossible for the attacker node 400 to calculate the hash value.

It is possible to use various well-known functions for the hash function such as message digest 5 (MD5) and a secure hash algorithm 1 (SHA1).

The transmitting unit 105 transmits a response message to the client node 200.

Figure 3:
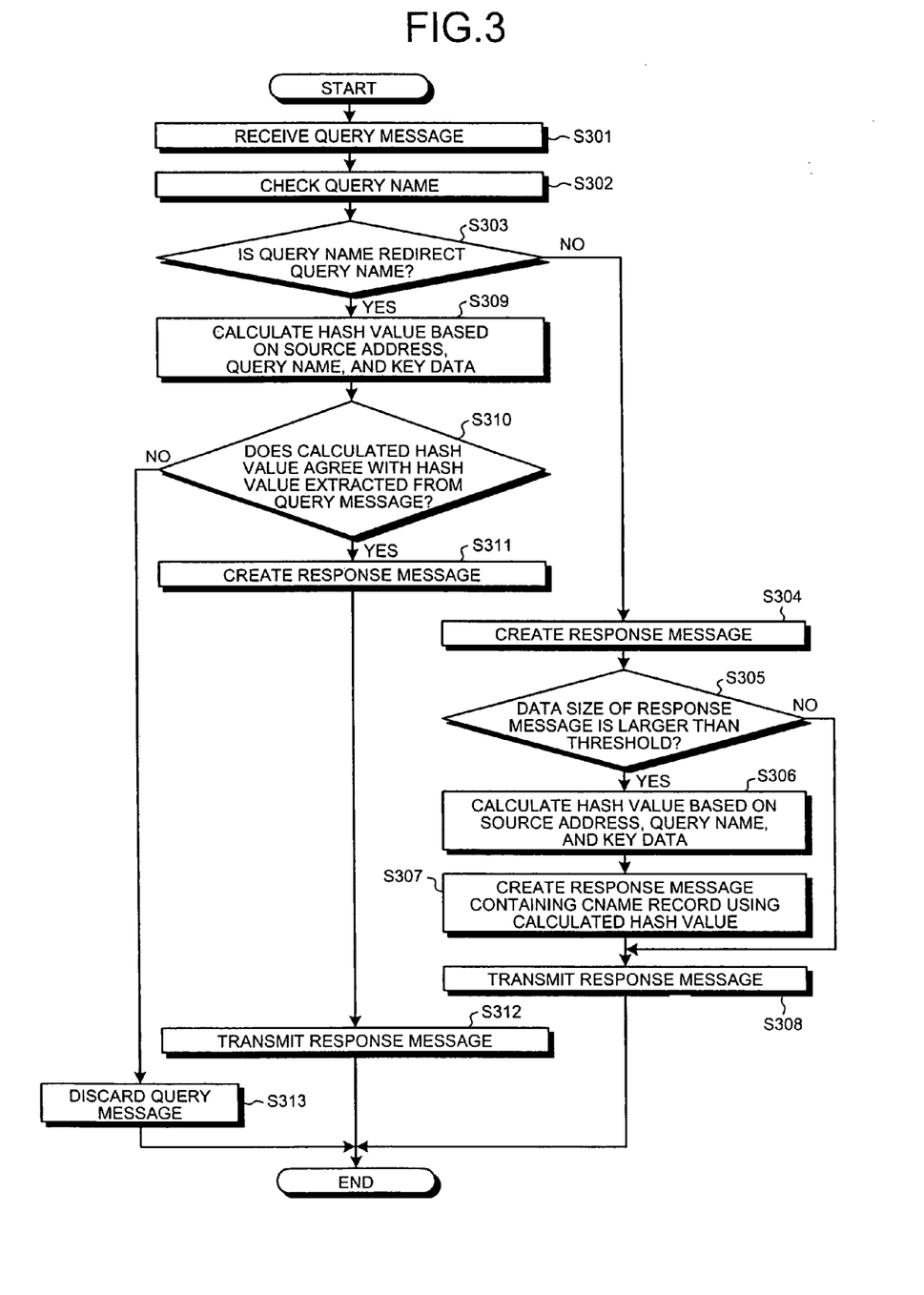
FIG. 3 is an overall flowchart of a response process according to the embodiment.

A response process performed by the DNS server 100 is described below with reference to FIG. 3.

The receiving unit 101 receives a query message for requesting the DNS name resolution from the client node 200 (step S301). The determining unit 103 checks a target domain name to be resolved contained in the query message (hereinafter, "query name") (step S302). Specifically, the determining unit 103 checks whether the query name has "rcname" at its head (step S302).

When the query name has "rcname" at its head, the determining unit 103 determines that the query name is a redirect query name, and when the query name does not have "rcname" at its head, the determining unit 103 determines that the query name is not the redirect query name (step S303). When the query name is not the redirect query name (No at step S303), the creating unit 102 obtains a resource record corresponding to the query name from the DNS-data storage unit 122, and creates a response message containing the resource record (Step S304).

The determining unit 103 determines whether the data size of the created response message is larger than the threshold value (step S305). When the data size of the response message is not larger than the threshold value (No at step S305), the transmitting unit 105 transmits the response message created at step S304 to the client node 200 (step S308). It means that if the response message is not large enough for causing an effective DoS amplification attack, the DNS server 100 transmits the response message to the client node 200 regardless of whether the query message is transmitted from the attacker node 400, which makes it possible to reduce a burden on the DNS server 100.

When the data size of the response message is larger than the threshold value (Yes at step S305), the calculating unit 104 calculates a hash value to be contained in a response message for requesting a redirect reply. Specifically, the calculating unit 104 calculates the hash value by a predetermined hash function from a hash key obtained by linking three binarized values of the source IP address, the query name, both contained in the query message, and the key data stored in the DNS-data storage unit 122 (step S306).

The creating unit 102 creates a CNAME record containing a query name edited using the calculated hash value, and creates a response message for requesting a redirect reply containing the CNAME record (step S307).

Figure 4:
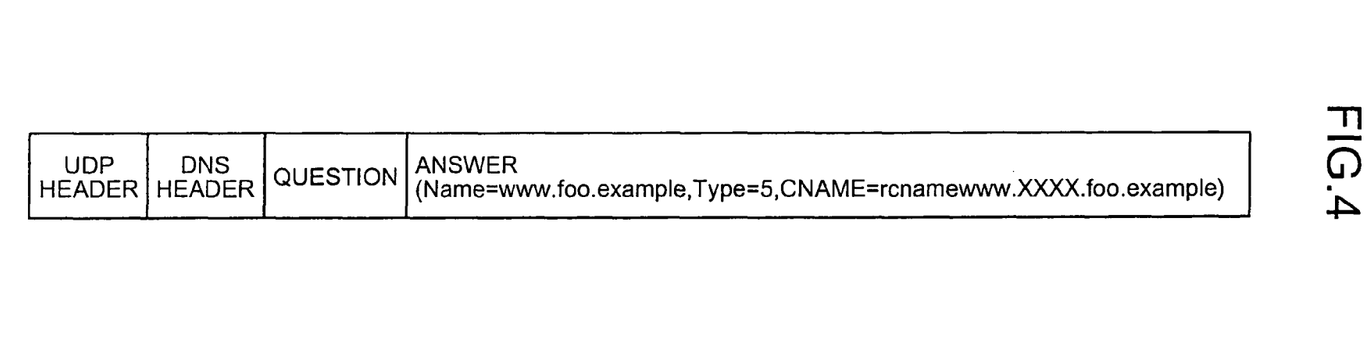
FIG. 4 is a schematic view for explaining an example of a response message for requesting a redirect reply according to the embodiment.

As shown in FIG. 4, DNS packet is created as the response message for requesting the redirect reply. The DNS packet has the CNAME record in addition to predetermined headers (that is, a user datagram protocol (UDP) header and a DNS header) specified by the DNS.

As shown in FIG. 4, the DNS packet is an example of the response message for requesting the redirect reply in case of the query name being "www.foo.example". The DNS packet contains "www.foo.example. CNAME rcnamewww.XXXX.foo.example." as the CNAME record, where "XXXX" indicates an American national standard code for information interchange (ASCII) sequence corresponding to the calculated hash value encoded by encoders such as base64.

Returning to FIG. 3, the transmitting unit 105 transmits the response message created at step S307 to the client node 200

(step S308). Because the response message created at step S307 contains the CNAME record only, the data size of the response message is almost equal to that of the query message. It means that, if an amplification attack is caused by the transmitted response message, the damage is slight.

When the determining unit 103 determines that the query name is the redirect query name (Yes at step S303), the calculating unit 104 calculates a hash value for verifying validity of the query message. Specifically, the calculating unit 104 extracts the original query name from the redirect query name. For example, when the redirect query name is "rcnamewww.XXXX.foo.example", the original query name "www.foo.example" is extracted by removing "rcname" and "XXXX." representing the encoded hash value.

The calculating unit 104 calculates a hash value by the hash function used at step S306 from a hash key obtained by linking three binarized values of the source IP address in the query message, the extracted original query name, and the key data stored in the DNS-data storage unit 122 (step S309).

The determining unit 103 determines whether a hash value contained in the redirect query name agrees with the calculated hash value (step S310). When the determining unit 103 determines that the two hash values agree (Yes at step S310), the creating unit 102 obtains the resource record corresponding to the extracted query name from the DNS-data storage unit 122 to create a response message containing the resource record as a result of the name resolution (step S311).

The transmitting unit 105 transmits the response message created at the step S311 (step S312), and the DNS server 100 ends the response process.

When the determining unit 103 determines that the two hash values do not agree (No at step S310), the determining unit 103 discards the query message (step S313), and the DNS server 100 ends the response process.

Cases are described below to explain the anti-DoS process. In a first case, the client node 200 that has validity transmits a query message for requesting the name resolution of the domain name "www.foo.example" to the DNS server 100.

The determining unit 103 checks the domain name (query name) (step S302), and determines that a label (a character string representing a part of the domain name separated by a period) of "www" in the zone does not conform to the redirect label name (rcnamewww) (No at step S303).

The determining unit 103 determines whether a data size of a response message containing a correspondent resource record is larger than the threshold value (step S305). The determining unit 103 determines that the data size is larger than the threshold value (note that a data size of the response message to a query on "www.foo.example" is assumed to be larger than the threshold value, as described above) (Yes at step S305). The creating unit 102 creates a response message for requesting a redirect reply (step S307).

The calculating unit 104 calculates a hash value by the hash function from the source IP address, the query name "www.foo.example.", and the secret key K. The creating unit 102 creates the response message requesting for a redirect reply containing a CNAME record of "www.foo.example. CNAME rcnamewww.XXXX.foo.example", where XXXX indicates an encoded value of the calculated hash value.

Hereinafter, as a matter of convenience, the "XXXX" is calculated by $$XXXX = \text{hash-encode}(C, \text{www.foo.example}, K) \qquad (1)$$

where C indicates the source IP address,
www.foo.example indicates the query name, and
K indicates the secret key K.

Upon receiving the response message for requesting a redirect reply, the client node 200 transmits another query message (a redirect message) for requesting the name resolution of the query name expressed in the CNAME record of "rcnamewww.XXXX.foo.example". A process performed by the DNS server 100 upon receiving the redirect message is described below.

The determining unit 103 checks the query name (step S302), and determines that a label of "rcnamewww" in the zone conforms to the redirect label name (Yes at step S303).

The DNS server 100 starts a verifying process of the query name. The calculating unit 104 extracts the query name of "www.foo.example", which is a part of the label following "rcname" without "XXXX" that represents the encoded hash value, and calculates XXXX' by $$XXXX' = \text{hash-encode}(C', \text{www.foo.example}, K) \qquad (2)$$

where C' indicates a source IP address of the redirect message.

In the first case where the client node 200 is valid, C and C' agrees, so that the calculated hash value XXXX' agrees with the hash value XXXX contained in the query name (Yes at step S310). Therefore, the determining unit 103 determines that the redirect message is valid. The transmitting unit 105 transmits a response message containing a resource record corresponding to the original query name of "www.foo.example" to the client node 200 the IP address of which is C' (step S312).

As a result, the client node 200 obtains an answer to "www.foo.example".

In a second case, the client node 200 that has validity transmits a query message for requesting the name resolution of another domain name "zzz.foo.example" to the DNS server 100.

The determining unit 103 checks the domain name (query name) (step S302), and determines that a label of "zzz" in the zone does not conform to the redirect label name (rcnamewww) (No at step S303).

The determining unit 103 determines whether the data size of a response message containing a correspondent resource record is larger than the threshold value (step S305). The determining unit 103 determines that the data size is not larger than the threshold value (note that a data size of a response message to a query on "zzz.foo.example" is smaller than the threshold value, as described above) (No at step S305). The transmitting unit 105 transmits the response message containing the correspondent resource record (step S308).

In a third case, the attacker node 400 transmits a query message with a spoofed source IP address for requesting the name resolution of "www.foo.example" to the DNS server 100. Likewise in the first case, the determining unit 103 determines that a data size of the query message is larger than the threshold value (Yes at step S305), and the transmitting unit 105 transmits a response message for requesting a redirect reply containing "www.foo.example. CNAME rcnamewww.YYYY.foo.example" as the CNAME record (step S308), where "YYYY" is calculated by $$YYYY = \text{hash-encode}(V, \text{www.foo.example}, K) \qquad (3)$$

where V indicates the source address of the query message, and is an IP address of the victim node 300 spoofed by the attacker node 400.

Although the response message for requesting a redirect reply is transmitted to the victim node 300, the victim node 300 that has not transmitted the query message ignores the response message, which brings an end of the anti-DoS process. Because the response message for requesting a redirect reply contains the CNAME record only, the data size of the response message is almost equal to that of the query message. Therefore, the DoS amplification attack is ineffective.

On the other hand, in order to transmit an amplified response message to the victim node 300, the attacker node 400 has to transmit a redirect message containing the query name of "rcnamewww.YYYY.foo.example" to the DNS server 100, where "YYYY" is calculated by Equation (3). To calculate YYYY, the secret key K, which is known only by the administrator of the DNS server 100, is essential. However, in normal cases, it is impossible for the attacker node 400 to obtain the secret key K. Therefore, the attacker node 400 can not calculate YYYY and does not cause a DoS amplification attack.

Figure 5:
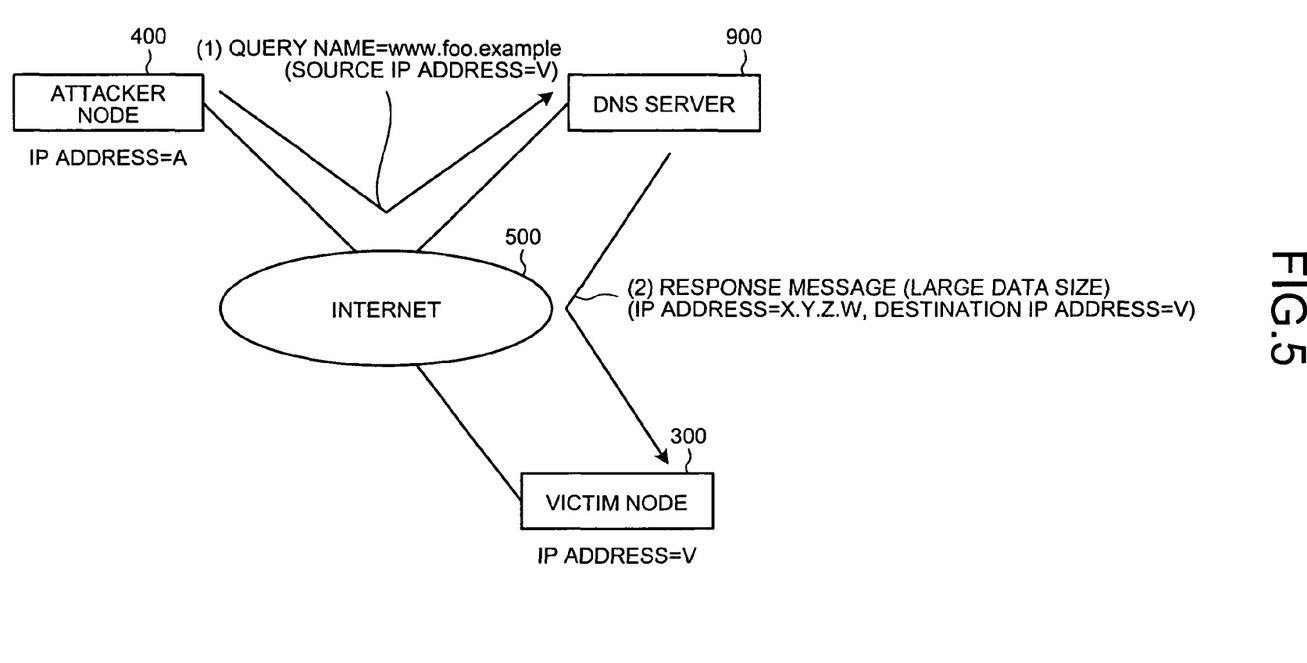
FIG. 5 is a schematic view for explaining a response process performed by a conventional DNS server.
Figure 6:
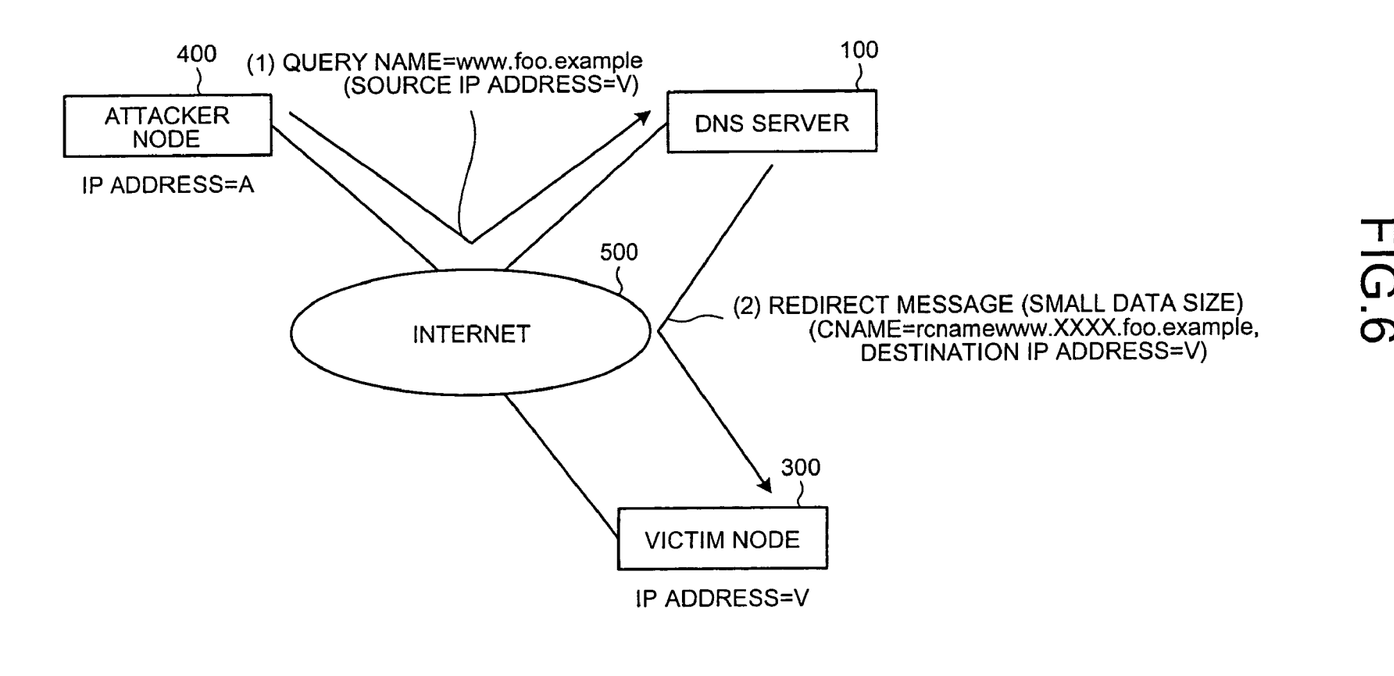
FIG. 6 is a schematic view for explaining the response process performed by the DNS server according to the embodiment.

The present embodiment is described in comparison with the conventional technique with reference to FIGS. 5 and 6.

In the conventional technique as shown in FIG. 5, (1) when the attacker node 400 transmits the query message with the spoofed source IP address V that is originally the IP address of the victim node 300 for requesting the name resolution of "www.foo.example" to the DNS server 100, (2) a DNS server 900 transmits the response message containing an IP address (x.y.z.w) corresponding to the query name "www.foo.example" to the victim node 300. As a result, if the data size of the response message is large, the attacker node 400 succeeds a DoS amplification attack.

On the other hand, in the present embodiment as shown in FIG. 6, (1) even when the attacker node 400 transmits the query message with the spoofed source IP address V that is originally the IP address of the victim node 300 for requesting the name resolution of "www.foo.example" to the DNS server 100, (2) the DNS server 100 transmits a small data-sized response message for requesting a redirect reply instead of the response message containing the IP address (x.y.z.w). As a result, the attacker node 400 fails to make an effective DoS amplification attack. Moreover, because it is impossible for the attacker node 400 to obtain the secret key K, the attacker node 400 can not succeed the effective DoS amplification attack by falsifying the redirect message.

According to an aspect of the present invention, in a client-server communication system in which, upon receiving a query, data corresponding to the query is responded, it is possible to prevent a DoS amplification attack on another communication device caused by transmitting a large data-size response message as a reply to a query with a spoofed source address, make it possible to improve security in the communication system.

Furthermore, because the process performed by client nodes is a standard procedure based on the CNAME record, it is possible to prevent a DoS amplification attack without having the client nodes support, such as any additional program or the like for the anti-DoS process. Thus, it is possible to reduce costs for development or implementation of building the anti-DoS attack system.

Figure 7:
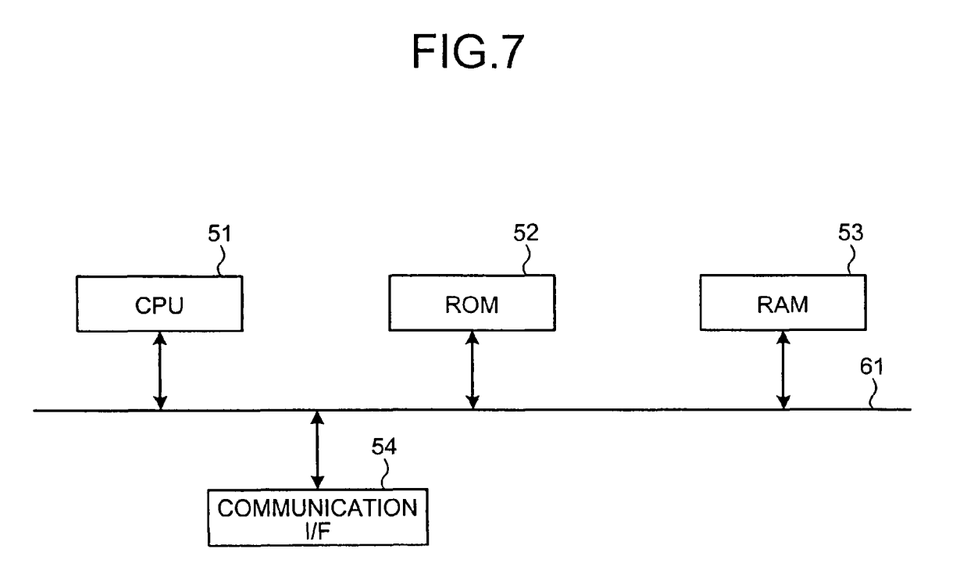
FIG. 7 is a block diagram of the DNS server according to the embodiment.

A hardware configuration according to the present embodiment is described below with reference to FIG. 7.

The DNS server 100 includes a controller such as a central processing unit (CPU) 51, storage units such as a read only memory (ROM) 52 and a RAM (random access memory) 53, an communication interface (I/F) 54 for connecting to a network, drive units such as a hard disk drive (not shown) and a compact disc drive (not shown), a displaying device (not shown), input devices such as a keyboard (not shown) or a mouse (not shown), and a bus 61 for connecting the above units to each other. It means that the DNS server 100 has the hardware configuration using an ordinal computer.

An anti-DoS program executed by the DNS server can be stored, in a form of a file installable and executable on a computer, in a recording medium readable by the computer, such as a compact disk-read only memory (CD-ROM), a flexible disk (FD), a compact disk-recordable (CD-R), and a digital versatile disk (DVD).

In addition, the anti-DoS program can be stored in another computer connected to the computer via a network, and downloaded to the computer via the network. The anti-DoS program can be delivered or distributed via a network such as the Internet.

Moreover, the anti-DoS program can be delivered or distributed in a state preinstalled into a storage unit such as a ROM.

The anti-DoS program is made up of modules such as the receiving unit, the creating unit, the determining unit, the calculating unit, and the transmitting unit. As an actual hardware configuration, when the CPU (processor) reads the anti-DoS program from the above storage medium and executes the read program, the above units are loaded and created on a main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server apparatus capable of communicating with at least one of client apparatuses via a network, the server apparatus comprising:

a receiving unit configured to receive a first query message that contains address data for indicating a source client apparatus and query data concerning a question via the network and configured to receive a second query message that contains the address data and the query data related with first identifying data via the network;

a calculating unit configured to calculate the first identifying data based on the address data contained in the first query message and configured to calculate second identifying data based on the address data contained in the second query message;

a creating unit configured to relate the first identifying data with the query data, and create a first response message that contains the query data related with the first identifying data and reply requesting data for requesting to re-transmit the question;

a determining unit configured to determine validity of the client apparatus specified by the address data based on the first identifying data related with the query data contained in the second query message and the second identifying data; and a transmitting unit configured to transmit the first response message to the client apparatus specified by the address data, wherein the creating unit is further configured to create a second response message that contains an answer to the query data when the determining unit determines that the client apparatus specified by the address data is valid, the transmitting unit is further configured to transmit the second response message to the client apparatus specified by the address data, the creating unit is further configured to create a third response message that contains an answer to the query data contained in the first query message when the receiving unit receives the first query message, the determining unit is further configured to determine whether a data size of the third response message is larger than a predetermined threshold value, the calculating unit is further configured to calculate the first identifying data based on the address data contained in the first query message when the determining unit determines that the data size is larger than the threshold value, the creating unit is further configured to create the first response message when the determining unit determines that the data size is larger than the threshold value, and the transmitting unit is further configured to transmit the first response message to the client apparatus specified by the address data when the determining unit determines that the data size of the third response message is larger than the threshold value, and is further configured to transmit the third response message to the client apparatus specified by the address data when the determining unit determines that the data size is equal to or smaller than the threshold value.

2. The apparatus according to claim 1, wherein:

the calculating unit is further configured to calculate the first identifying data based on the address data contained in the first query message and predetermined key data, and the calculating unit is further configured to calculate the second identifying data based on the address data contained in the second query message and the key data.

3. The apparatus according to claim 2, wherein:

the calculating unit is further configured to calculate the first identifying data based on the query data contained in the first query message, the address data contained in the first query message, and the key data, and the calculating unit is further configured to calculate the second identifying data based on the query data contained in the second query message, the address data contained in the second query message, and the key data.

4. The apparatus according to claim 1, wherein:

the calculating unit is further configured to calculate by a predetermined hash function, a hash value of the address data contained in the first query message as the first identifying data, the calculating unit is further configured to calculate by the hash function, a hash value of the address data contained in the second query message as the second identifying data, and the determining unit is further configured to determine that the client apparatus that has transmitted the second query message is valid, when the first identifying data related with the query data contained in the second query message agrees with the second identifying data.

5. The apparatus according to claim 1, wherein:

the receiving unit is further configured to receive the first query message that contains a target domain name to be resolve by a domain name system (DNS) name resolution as the query data, and the creating unit is further configured to create the first response message that contains a canonical name (CNAME) record for the DNS as the reply requesting data.

6. The apparatus according to claim 5, wherein the creating unit is further configured to create the first response message that contains the CNAME record as the reply requesting data, the CNAME record containing the target domain name that is obtained by adding predetermined additional data to the first identifying data as a canonical name corresponding to the target domain name.

7. The apparatus according to claim 6, wherein the creating unit is further configured to obtain the target domain name from the canonical name contained in the CNAME record in the second query message, and to create the second response message that contains an answer to the obtained target domain name, when the determining unit determines that the first identifying data agrees with the second identifying data.

8. A method of preventing denial-of-service attack to a server apparatus capable of communicating with at least one of client apparatuses via a network, the method comprising:

receiving via the network a first query message that contains address data for indicating a source client apparatus and query data concerning a question;

creating an answer response message that contains an answer to the query data contained in the first query message, upon receiving the first query message;

determining whether a data size of the answer response message is larger than a predetermined threshold value, upon determining that the data size of the answer response message is equal to or smaller than the predetermined threshold value, transmitting the answer response message to the client apparatus specified by the address data, and upon determining that the data size of the answer response message is larger than a predetermined threshold value, calculating first identifying data based on the address data contained in the first query message, relating the first identifying data with the query data, and creating a first response message that contains the query data related with the first identifying data and reply requesting data for requesting to transmit the question again;

transmitting the first response message to the client apparatus specified by the address data;

receiving via the network a second query message that contains the address data and the query data related with the first identifying data;

calculating second identifying data based on the address data contained in the second query message;

determining validity of the client apparatus that has specified by the address data based on the first identifying data related with the query data contained in the second query message and the second identifying data;

creating a second response message that contains an answer to the query data when the client apparatus specified by the address data is determined to be valid; and transmitting the second response message to the client apparatus specified by the address data.

9. A non-transitory computer-readable storage medium storing a computer program product, the computer program product including programmed instructions for preventing denial-of-service attack to a server apparatus capable of communicating with at least one of client apparatuses via a network, wherein the instructions, when executed by a computer, cause the computer to perform:

receiving via the network a first query message that contains address data for indicating a source client apparatus and query data concerning a question;

creating an answer response message that contains an answer to the query data contained in the first query message, upon receiving the first query message;

determining whether a data size of the answer response message is larger than a predetermined threshold value, upon determining that the data size of the answer response message is equal to or smaller than the predetermined threshold value, transmitting the answer response message to the client apparatus specified by the address data, and upon determining that the data size of the answer response message is larger than a predetermined threshold value, calculating first identifying data based on the address data contained in the first query message, relating the first identifying data with the query data, and creating a first response message that contains the query data related with the first identifying data and reply requesting data for requesting to transmit the question again;

transmitting the first response message to the client apparatus specified by the address data;

receiving via the network a second query message that contains the address data and the query data related with the first identifying data;

calculating second identifying data based on the address data contained in the second query message;

determining validity of the client apparatus that has specified by the address data based on the first identifying data related with the query data contained in the second query message and the second identifying data;

creating a second response message that contains an answer to the query data when the client apparatus specified by the address data is determined to be valid; and transmitting the second response message to the client apparatus specified by the address data.

* * * * *